(12) United States Patent
Fong (10) Patent No.: US 7,684,482 B2
(45) Date of Patent: Mar. 23, 2010

(54) SINGLE WIRE COMMUNICATION CIRCUITS AND METHODS

(75) Inventor: Vincent Lok-Cheung Fong, Cupertino, CA (US)

(73) Assignee: PacificTech Microelectronics, Inc. (KY)

( * ) Notice: Subject to any disclaimer, the term of this patent is extended or adjusted under 35 U.S.C. 154(b) by 650 days.

(21) Appl. No.: 11/698,765

(22) Filed: Jan. 26, 2007

(65) Prior Publication Data

US 2008/0209250 A1    Aug. 28, 2008

(51) Int. Cl.
*H03K 7/08* (2006.01)
*H03K 9/08* (2006.01)

(52) U.S. Cl. .................. 375/238; 375/219; 375/222; 375/316; 375/324; 375/340

(58) Field of Classification Search .......... 375/219, 375/222, 238, 316, 324, 340
See application file for complete search history.

(56) References Cited

U.S. PATENT DOCUMENTS

| | | | |
|---|---|---|---|
| 5,210,846 A | 5/1993 | Lee | |
| 5,809,518 A * | 9/1998 | Lee | 711/115 |
| 7,053,667 B1 | 5/2006 | Tang | |
| 7,454,644 B2 * | 11/2008 | Giovinazzi et al. | 713/500 |
| 7,484,693 B2 * | 2/2009 | Eng | 244/173.3 |

OTHER PUBLICATIONS

Analogic Tech; "AAT1231/1231-1 Step-Up DC/DC Converters for White LEF Backlight Applications"; data sheet; Oct. 2006.
Dallas Semiconductor Maxim; "DS18B20 Programmable Resolution 1-Wire Digital Thermometer"; data sheet; Oct. 2006.

* cited by examiner

*Primary Examiner*—Ted M Wang
(74) *Attorney, Agent, or Firm*—Fountainhead Law Group PC (57) ABSTRACT

Embodiments of the present invention include systems and methods of control using a single wire. The systems and methods presented allow sending or receiving commands and data through a single wire. In one embodiment, commands and data are received by the control system through a single terminal. In another embodiment, commands and data are received and transmitted from the control system through a single terminal.

18 Claims, 5 Drawing Sheets

SINGLE WIRE COMMUNICATION CIRCUITS AND METHODS

BACKGROUND

The present invention relates to communication systems, and in particular, to single wire communication systems and methods.

Devices that allow communication of information such as data or commands between electronic circuitry are known as communication systems. These systems are typically implemented on an integrated circuit where two or more terminals of the circuit are used to relay information. The information may be transmitted to or received from an operator, for example. The information may also be transmitted between other electronic devices within the system. There are typically two types of information sent and received: command information and data information. One example of command information is one component in a computer transmitting commands to another component. One example of data information is one component in a computer transmitting a number to another component.

Systems communicating in a digital format do so by transmitting a series of zeros and ones. The zeros and ones, also known as bits, are received by devices where they are decoded into useful information such as commands and data. Information within the system may be sent between devices through the process of encoding the information into a stream of bits. The method of encoding used to translate the bits may vary depending on the device. Typically, two digital devices that are coupled together share similar encoding and decoding schemes.

Figure 1:
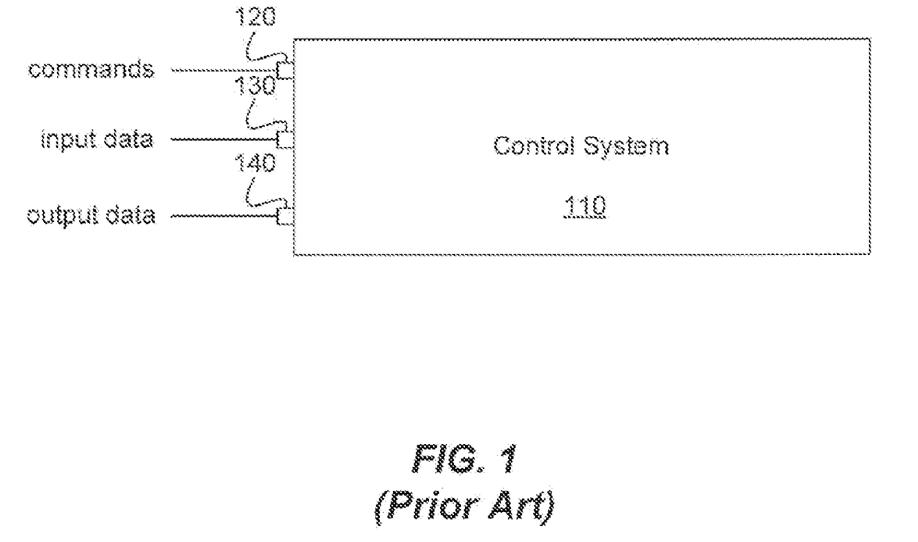
FIG. 1 illustrates an electronic circuit including a typical communication technique.

FIG. 1 illustrates an electronic circuit including a typical communication technique. A first terminal 120 may be used to receive commands while a second terminal 130 may be used to receive data. Some systems may also include additional terminals, such as third terminal 140, to send data, commands, or other information back to the transmitting electronic device. The method of sending commands, input data, output data, or other information varies between different communication systems. Typically, each piece of information may require a separate different terminal on the receiving or transmitting system.

With the ever increasing demand for more efficient and cost effective electronic devices, there is a desire to reduce the number of wires used for communications between electronic circuits. While electronic circuits are become smaller, the number of terminals on a circuit or pins on a packaged integrated circuit can limit the amount by which a circuit may be reduced in size. For example, when internal terminals are couple to pins on an integrated circuit package, each terminal is typically first coupled to a relatively large pad, which in turn is coupled to the package pin by bond wires. The pads are typically arranged around the perimeter of the integrated circuit, and in some cases may determine the size of chip (i.e., the perimeter of the chip must be large enough for the pads to sit side by side around the entire perimeter). Accordingly, reducing the number of communication wires can lead to lower costs because the number of pads and/or pins may be reduced.

Thus, there is a need for improved communication techniques. The present invention solves these and other problems by providing single wire communication systems methods.

SUMMARY

Embodiments of the present invention include systems and methods of control using a single wire. The systems and methods presented allow sending or receiving commands and data through a single wire. In one embodiment, commands and data are received by the control system through a single terminal. In another embodiment, commands and data are received and transmitted from the control system through a single terminal.

Additional embodiments will be evident from the following detailed description and accompanying drawings, which provide a better understanding of the nature and advantages of the present invention.

DETAILED DESCRIPTION

Described herein are single wire communication systems and methods. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 2:
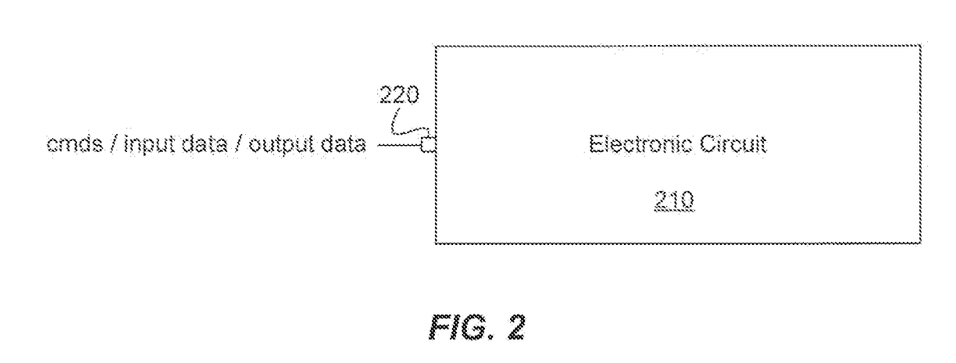
FIG. 2 illustrates a communication system according to one embodiment of the present invention.

FIG. 2 illustrates a communication system according to one embodiment of the present invention. Electronic system 210 includes a single terminal 220 for receiving both commands and data. In one embodiment, the single terminal is a pin on an integrated circuit package, for example. Signals representing commands and/or data are received by the electronic system through the single terminal. In one embodiment, the commands and/or data are received as encoded bits wherein the encoded bits are received serially and transformed into commands or data within the electronic circuit. In one embodiment, signals representing commands and/or data may also be transmitted from electronic circuit 210 through the single terminal 220. In one embodiment, commands or data within the control system are encoded and transmitted serially through the single terminal.

Figure 3:
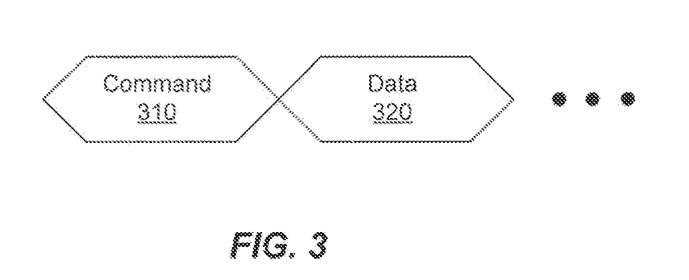
FIG. 3 illustrates a single wire communication signal according to one embodiment of the present invention.

FIG. 3 illustrates a single wire communication signal received by pin 220 in FIG. 2 according to one embodiment of the present invention. The signal comprises a command portion 310 and data portion 320, wherein the data may follow the commands, for example. The number of encoded bits within each portion may be fixed or variable. In one example embodiment shown below, the commands comprise a fixed number of bits and the data comprises a variable number of bits. The commands and data may be used to perform a variety of functions, such as control functions or programming functions, for example. In one particular embodiment, a command may be received to trigger a particular fuse. After the electronic circuit receives the command informing the system to trigger a fuse, the electronic circuit may receive the additional data to determine which fuse to trigger. This additional data will be sent in the data portion of the signal 320 following the command portion of the signal 310 over a single wire. However, in other embodiments commands may be sent without data, and data may be sent without commands. For example, a command to turn off a device, such as an electro luminous lamp, would only require the command portion. After receiving the command, no other information may be required to execute that command.

Figure 4:
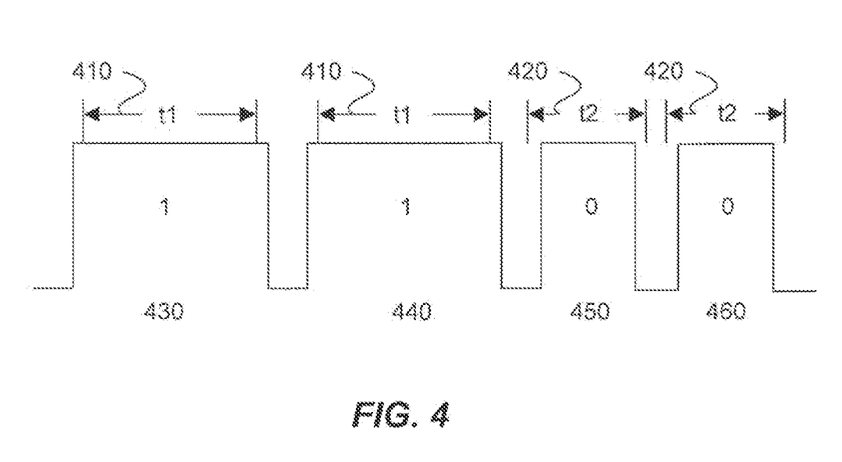
FIG. 4 illustrates an example of a single wire communication signal according to one embodiment of the present invention.

FIG. 4 illustrates an example of a single wire communication signal according to one embodiment of the present invention. In this example, command 310 in FIG. 3 is a series of encoded bits. The command portion comprises a series of encoded bits represented as pulses wherein the pulses having a pulse width above a first threshold time period, t1, represent a first digital value and the pulses having a pulse width below a second threshold time period, t2, smaller than the first threshold represent a second digital value. In FIG. 4, pulse widths above threshold 410 ("t1") represent a digital "one" and pulses below threshold 420 ("t2") represent a digital "zero." In this figure, the first pulse received 430 is longer than threshold time period 410 so it represents a digital "one". The second pulse 440 is also longer than threshold 410 and also represents a "one." The third pulse 450 is smaller than threshold time period 420, so it represents a "zero." Pulse 460 is also smaller than threshold 420 so it also represents a "zero." The four digital bits "1100" may be decoded by electronic system 210 into a specific command to be performed by the system, for example.

Figure 5:
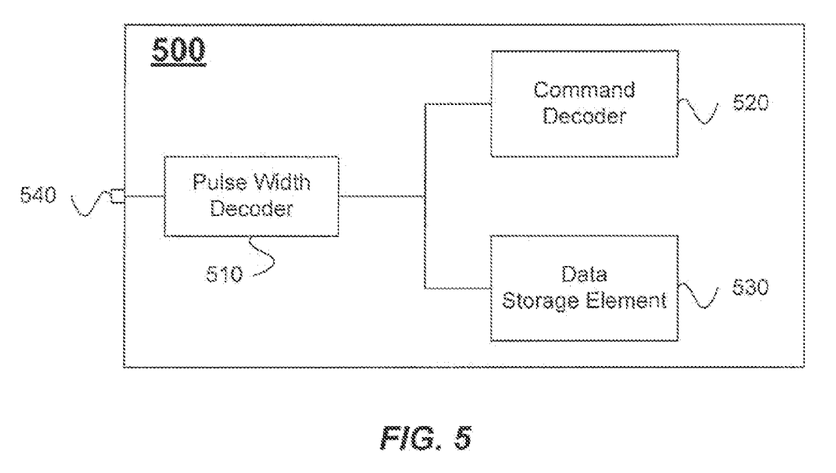
FIG. 5 illustrates an electronic circuit including a single wire communication system according to one embodiment of the present invention.

FIG. 5 illustrates an electronic circuit including a single wire communication system according to one embodiment of the present invention. System 500 includes pulse width decoder 510 having an input coupled to single terminal 540. In one embodiment, the incoming signal comprises pulse width modulated encoded bits as described above. Pulse width decoder 510 translates the encoded input signal into a sequence of digital bits. In one embodiment, the pulse width decoder 510 will generate a digital one (i.e., '1') if the pulse width of a received pulse is larger than a first threshold and will generate a digital zero (i.e., '0') if the pulse width of a received pulse is smaller than a second threshold. In another embodiment, the pulse width decoder 510 will generate a digital one if the pulse width is smaller than a first threshold and will generate a digital zero if the pulse width is larger than a second threshold. The output of pulse width decoder 510 may be coupled to command decoder 520 and data storage element 530. Command decoder 520 may receive a first set of digital bits from the pulse width decoder and translate it into a command. Data storage element 530 may receive a second set of digital bits and either store the bits as, or translate the bits into, data. In other embodiments, command decoder and data decoder may have separate dedicated decoders coupled to the single terminal for decoding received signals. In yet another embodiment described in more detail below, commands are encoded using a first scheme and data is encoded using a second scheme. Digital values, for example, may be encoded as a series of equal duration pulses. The pulses may be detected and decoded into a series of binary values, for example. In this case, the received signal is first stored and then decoded.

Figure 6:
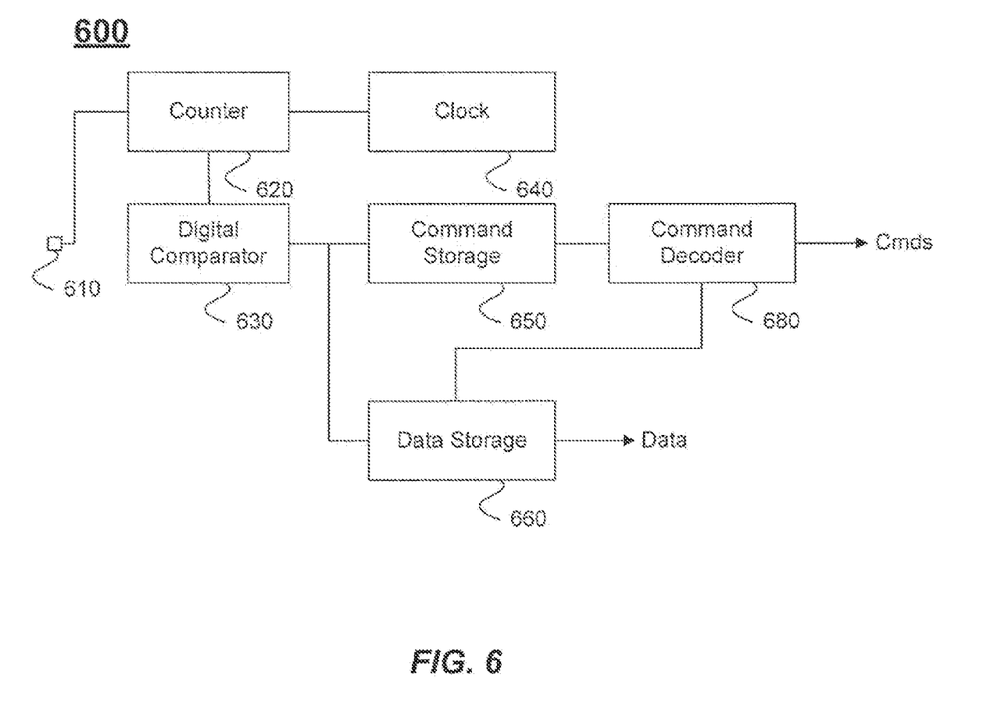
FIG. 6 illustrates an electronic system including a single wire communication system according to one embodiment of the present invention.

FIG. 6 illustrates an electronic circuit including a single wire communication system according to one embodiment of the present invention. Electronic circuit 600 includes single terminal 610, counter 620, digital comparator 630, clock 640, command storage 650, data storage 660, and command decoder 680. Single terminal 610 is coupled to the input of counter 620. Incoming data encoded in the form of pulses is sent to the single terminal and received by counter 620. The counter is also coupled to clock 640 which provides the signal to increment the counter. Counter 620 measures the pulse width of received pulses by counting the number of clock cycles corresponding to each pulse width. For example, when a received pulse transitions from low to high ('0' to '1'), the counter may begin counting. When the pulse transitions from high to low, the counter may stop counting. The resulting count represents the duration of the received pulse width.

The input of digital comparator 630 is coupled to the output of counter 620. Comparator 630 translates the pulse widths of received signals into digital bit values. The translation process may include comparing the counter value against predefined values. For example, the comparator may output a digital bit value of one ('1') if the counter value is larger than a first preset value (e.g., a digital value of 128) and the comparator may output a digital bit value of zero ('0') if the counter value is smaller than a second preset value (e.g., a digital value of 16).

The input of command storage 650 is coupled to the output of digital comparator 630. Command storage 650 receives digital bits from the digital comparator. These digital bits represent a command from the incoming signal. The digital bits may be received sequentially and stored (e.g., in a register). Command storage 650 is coupled to the input command decoder 680. When all the digital bits necessary to decode the command have been received, the command decoder may decode the digital bits into the desired command, for example.

The input of data storage 660 is also coupled to the single input terminal 610. In one embodiment, data storage is coupled to single terminal 610 directly, and in other embodiments data storage 660 may be coupled to single terminal through digital comparator 630 or another decoding circuit. Data storage 660 receives the data portion of the incoming signal. For example, after the command portion of the incoming signal is received, a command may be generated to activate the inputs of data storage 660. The digital bits may be received sequentially from the single terminal and stored (e.g., in a shift register). As mentioned above, the digital bits may be decoded in a similar manner as the command bits. Alternatively, the data portion may be encoded using a different encoding scheme than the command portion. In one embodiment described in more detail below, data values may be represented as a series of pulses having substantially equal pulse widths. The pulses may be detected and a digital value corresponding to the number of pulses is stored in data storage 660.

Figure 7:
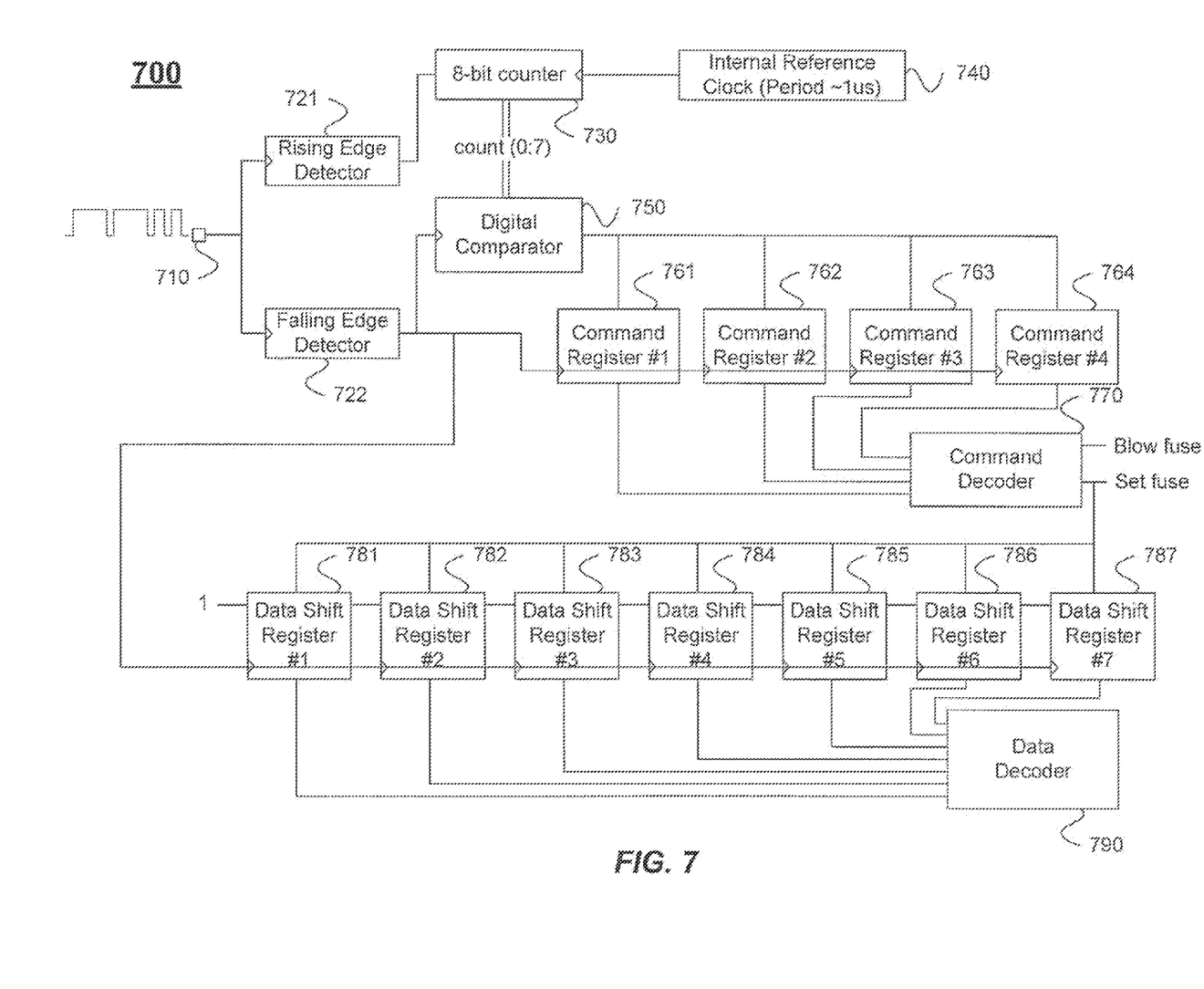
FIG. 7 is an example of an electronic circuit including a single wire communication system according to one embodiment of the present invention.

FIG. 7 is an example of an electronic circuit including a single wire communication system according to one embodiment of the present invention. In this example, the input signal received on single terminal 710 uses different encoding schemes for commands and data. Commands are encoded as two pulse widths above and below certain thresholds as described above. Data is encoded as a series of pulses, wherein the digital data value is represented as the number of pulses received or transmitted. For example, in one embodiment a series of equal length pulses may be received, and the data value is the number of pulses (i.e., 5 pulses is digital value '101').

Single terminal 710 is coupled to the input of rising edge detector 721. Rising edge detector 721 will output a high value whenever it receives a rising clock edge from the signal entering single terminal 710. The output of rising edge detector 721 is coupled to a reset input of counter 730, which in this example is an 8-bit counter. This allows the 8-bit counter to reset its counting sequence whenever the rising edge detector generates a high value. The input of the 8-bit counter is coupled to the output of internal reference clock 740. Internal reference clock 740 generates a clock signal at a fixed frequency. For example, the clock signal may have a period of 1 us. Of course, any other clock period could be used depending on the desired resolution or communication transfer rates, for example. The 8-bit counter receives the signal from the internal reference clock and increments based on the clock. For example, the 8-bit counter may increment on the rising edge of the clock. In another example, the 8-bit counter increments on the falling edge of the clock. This example is implemented using an 8-bit counter, but it is to be understood that other counters could be used. The size of the counter may vary based on factors such as longest pulse likely to be received or the value thresholds used in digital comparator 750, for example.

The output of 8-bit counter 730 is coupled by an 8-bit bus to digital comparator 750. The digital comparator receives the counter's value through the 8-bit bus. The digital comparator includes an enable input coupled to falling edge detector 722. The input of falling edge detector 722 is coupled to single terminal 710. Falling edge detector 722 will output a high value whenever it receives a falling clock edge from the signal entering single terminal 710. This high value is propagated to the enable of digital comparator 750. When the digital comparator is enabled, the value sent to the input on the 8-bit bus will be compared against some internal thresholds. The internal threshold values may be hardwired or programmed (e.g., in registers) for example. In one embodiment, the comparator will output a first digital bit value when it receives a value greater than a first threshold and a second digital bit value when it receives a value less than a second threshold. For example, the comparator may output a one if it receives a value from the 8-bit counter larger than 128 and will output a zero if it receives a value from the 8-bit counter smaller than 16. With proper selection of the threshold values, it is possible to output digital values based on the pulse widths of the signal entering single terminal 710.

The output of digital comparator 750 is coupled to command register 761, command register 762, command register 763, and command register 764. Each digital bit output by the digital comparator is placed in a different command register. For example, the first digital bit output by the digital comparator may be placed in command register #1 761, the second digital bit output placed in command register #2 762, the third digital bit output placed in command register #3 763, and the fourth digital bit output placed in command register #4 764. The enable of the command registers are connected to the output of falling edge detector 722. By coupling the enable for the command registers and the digital comparator to the same source, this allows the output of the digital comparator to be efficiently latched into a command register. Additional logic may be used to enable one register at a time so that outputs of the comparator are loaded into the counters serially. The number of command registers required be may vary depending on the total number of possible commands. For example, if the system has four commands, two command registers would be required. Similarly, if the system had 32 commands, five command registers would be required. The command registers are coupled to command decoder 770. Once the all command registers have received a digital bit from digital comparator 750, the command decoder decodes the bits received into a specific command. For example, "1100" may decode into setting a fuse while "1101" may decode into blowing a fuse. It is to be understood that commands may be used for a variety of applications.

Some commands may require data prior to execution. For example, the command to set a fuse may require information on which fuse to set. Accordingly, one or more commands may be used to control data decoding or data loading from the single terminal 710. In one embodiment, an output of the command decoder may be coupled to the reset inputs of data shift register #1 781 through data shift register #7 787. Therefore, the command output may be used to reset the array of shift registers. In this example, data shift registers 781 to 787 have their enable inputs coupled to the output of falling edge detector 722, and the data portion of the incoming signal is a series of equal duration pulses, wherein the data values are encoded such that the value is represented by the number of pulses received. On the falling edge of the incoming signal, the digital value stored in data shift register #1 781 will shift into data shift register #2 782. Likewise, the digital value stored in data shift register 782 will shift into data shift register #3 783. This continues similarly up through data register #7 787. In this example, data shift register #1 is coupled to a static digital bit value "one." Because of this, the values shifted into the data shift registers will always be the digital value "one", and the number of registers with a "one" represents the received data value (e.g., if 4 registers are "one" then the value is 4). Accordingly, the number of shift registers required be may vary depending on the set of values the data may represent. In one embodiment, the number of shift registers required is based on the upper numerical limit of the data. For example, if the data is a value between zero and four, four shift registers would be required. Similarly, if the data is a value between zero and nine, nine shift registers would be required.

The output of data shift register #1 781 through data shift register #7 787 are coupled to data decoder 790. In one embodiment, digital logic is coupled between the shift registers and data decoder. Digital logic may be used to control the enablement of data decoder 790. For example, digital logic may send an enable signal to the data decoder once the shift registers have been populated. Once the data portion of the incoming signal has been completely received, the data decoder decodes the digital bits received from the data shift registers. The outputs of the data decoder are coupled to a separate part of the system where the data may be used for a variety purposes. In one example, the data decoder outputs may be sent to an internal circuit that stores a value of selects a fuse. In another example, the outputs may be sent to separate internal systems as signals used in different processes.

Figure 8:
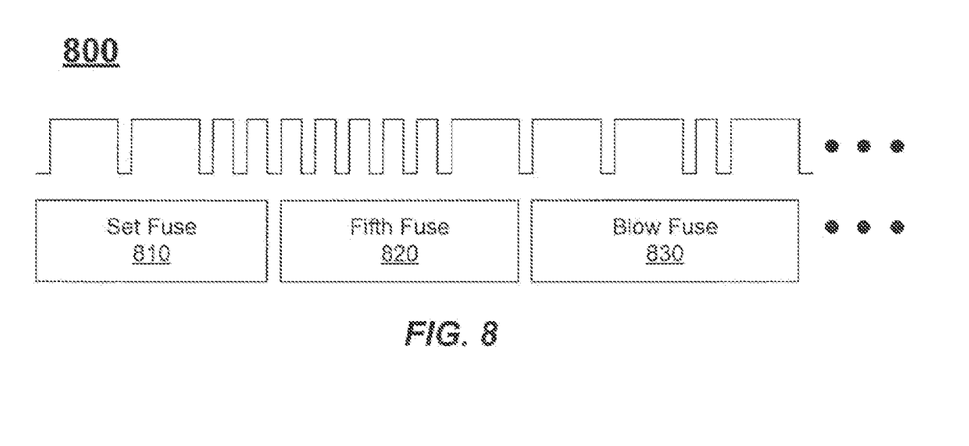
FIG. 8 illustrates an example of a signal received by a system according to one embodiment of the present invention.

FIG. 8 illustrates an example of an incoming signal according to one embodiment of the present invention. Signal 800 includes first command 810, data 820, and second command 830. The first command 810 commands the system to set a fuse. The system representation for this command is "1100." In order to perform this command, the system requires additional information to determine which fuse to set. Data portion 820 is received with the information needed by the system to determine which fuse to set. In this example, the fifth fuse is set. The system representation for the number five is "111110." The end points between successive command and data sets may be determined by additional signaling schemes. For example, in this embodiment the end of data is signaled by a long pulse. Accordingly, when data is received as a series of pulses with constant pulse widths, the end of the data portion may be determined by detecting a pulse width greater than a threshold (e.g., using the techniques described above). In this example, following the setting of the fuse is the second command 830 to blow the fuse. The system representation for this command is "1101." As can be seen in this example, one embodiment of the present invention has a fixed size for the command portion of the signal and a variable size for the data portion of the signal.

Figure 9:
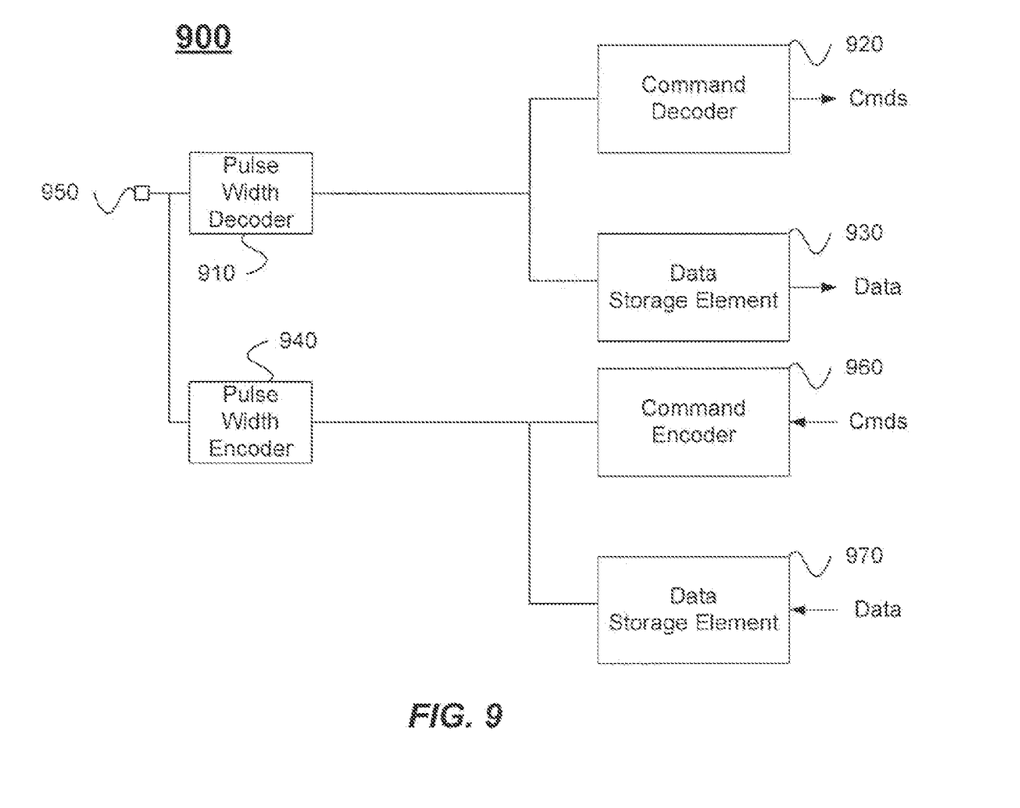
FIG. 9 illustrates a bidirectional communication system according to one embodiment of the present invention.

FIG. 9 illustrates a bidirectional communication system according to one embodiment of the present invention. System 900 comprises of pulse width decoder 910, command decoder 920, data storage element 930, pulse width encoder 940, command encoder 960, data storage element 970, and a single terminal 950. The pulse width encoder and decoder in this embodiment allows the system to both receive and transmit signals through single terminal 950. Single terminal 950 is coupled to the input of pulse width decoder 910. A signal received on single terminal 950 is coupled to pulse width decoder 910. Pulse width decoder 910 receives the encoded signal and translates it into digital bits. The output of pulse width decoder 910 is coupled to input of command decoder 920 and input of data storage element 930. This coupling allows the pulse width decoder to propagate digital bits to both the command decoder and the data storage element. Digital bits representing commands are received by the input of command decoder 920. Likewise, digital bits representing data are received by data storage element 930. Command decoder 920 receives the digital bits and generates commands to control system electronics. Data storage element 930 receives the digital bits and may either store the data or use the data. In one embodiment, the data is stored in registers. In another embodiment, the data is received directly from the single terminal and decoded as described above. Data may be coupled to internal resources for use by the electronic system.

The transmission path includes pulse width encoder 940, command encoder 960, and data encoder 970. Commands may be generated internal to the system and transmitted to control other devices, for example. Data may also be transmitted for programming other devices, exchanging information, or to be used with transmitted commands. Commands are received by command encoder 960 and encoded into digital representations. For example, an active signal on one command input line may be encoded as a digital value representing a command to be carried out by another device. Pulse width encoder 940 may encode the digital command values as a series of pulses having different pulse widths to be transmitted through single terminal 950 to another device. Similarly, data may be received by data storage element 970 and encoded by pulse width encoder 940 for transmission to other devices. In one embodiment, the digital bit values for the commands and data are encoded using pulses with different pulse widths as described above. In another embodiment, the commands are encoded using one encoding scheme and the data are encoded using another encoding scheme. For example, the output of data storage element 970 may be coupled to the input of pulse width encoder 940. Pulse width encoder 940 receives data bits from data storage element 970 and encodes them into encoded data bits. The digital values may be encoded as a series of pulses wherein the digital value of the data bits is represented by the number of pulses transmitted by the system on single terminal 950. The output of pulse width encoder 940 is coupled to single terminal 950. As the data bits are encoded sequentially, each encoded bit is serially coupled to single terminal 950 and transmitted to external devices.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, systems and methods of control using a single wire according to the present invention may include some or all of the innovative features described above. Based on the above disclosure and the following claims, other arrangements, embodiments, implementations and equivalents will be evident to those skilled in the art and may be employed without departing from the spirit and scope of the invention as defined by the claims.

What is claimed is:

1. A electronic system comprising:
a single terminal for receiving a first input signal comprising a command portion and a data portion;
a pulse width decoder having a input terminal coupled to the single terminal, the pulse width decoder generating a first plurality of digital bits at an output terminal in response to at least the command portion of the first input signal received on the single terminal;
a command decoder having an input coupled to the pulse width decoder, the command decoder receiving the first plurality of digital bits and generating a command; and
a data storage element having an input coupled to the single terminal for receiving data,
wherein the command portion or data portion of the first input signal comprises of a plurality of encoded bits, and wherein a first digital bit value is represented as a first pulse having a pulse width greater than a first time period, and a second digital bit value is represented as a second pulse having a pulse width less than a second time period.

2. The electronic system of claim 1 wherein a first digital bit value is represented in the command portion as a first pulse having a pulse width greater than a first time period, and a second digital bit value is represented in the command portion as a second pulse having a pulse width less than a second time period, and wherein the data portion represents digital values as a corresponding number of pulses.

3. The electronic system of claim 1 wherein command portion of the first input signal is encoded using a first encoding scheme and the data portion is encoded using a second encoding scheme.

4. The electronic system of claim 1 wherein the single terminal is a pin on an integrated circuit.

5. The electronic system of claim 1 wherein the pulse width decoder comprises a digital comparator.

6. The electronic system of claim 1 wherein the pulse width decoder comprises a counter.

7. The electronic system of claim 1 wherein the pulse width decoder comprises:
a counter coupled to the single terminal;
a clock coupled to the counter; and a digital comparator for generating a first digital bit value if a digital value in the counter is greater than a first digital value and for generating a second digital bit value if the digital value in the counter is less than as second digital value,
wherein the first digital value is greater than the second digital value.

8. The electronic system of claim 7 further comprising an edge detector coupled between the single terminal and the counter.

9. The electronic system of claim 7 wherein the digital comparator comprises:
a first input coupled to the counter; and
a second input coupled to the single terminal,
wherein the digital comparator is an edge triggered comparator.

10. The electronic system of claim 1 wherein the command decoder comprises a plurality of registers for storing digital bits received from the pulse width decoder.

11. The electronic system of claim 10 wherein the plurality of registers are coupled to the output of the pulse width decoder and the output of the registers are coupled to command decoder circuitry for generating a command in response to the digital bits stored in the plurality of registers.

12. The electronic system of claim 1 wherein the data storage element is coupled to an output of the command decoder.

13. The electronic system of claim 1 wherein the data storage element is a shift register, and wherein data is encoded in the first input signal as a plurality of pulses having the same pulse width.

14. The electronic system of claim 13 further comprising a data decoder coupled to the output of the plurality of shift registers.

15. A method of communicating digital information across a single wire comprising:
receiving a first input signal comprising plurality of encoded bits on a single terminal, the first input signal comprising a command portion and a data portion;
translating the command portion into digital bits;
decoding the command portion to generate a command;
translating the data portion into digital bits; and
storing the data portion in a data storage element,
wherein the first input signal encodes a first digital bit value as a first pulse having a pulse width less than a first time period, and wherein the first input signal encodes a second digital bit value as a second pulse having a pulse width greater than a second time period.

16. The method of claim 15 wherein the number of encoded bits in the command portion is a fixed number.

17. The method of claim 15 wherein the number of encoded bits in the data portion is a variable number.

18. The method of claim 15 wherein a first digital bit value is represented in the command portion as a first pulse having a pulse width greater than a first time period, and a second digital bit value is represented in the command portion as a second pulse having a pulse width less than a second time period, and wherein the data portion represents digital values as a corresponding number of pulses.

* * * * *